(12) United States Patent
Namiki et al.

(10) Patent No.: US 9,920,169 B2
(45) Date of Patent: Mar. 20, 2018

(54) CURABLE COMPOSITION

(71) Applicant: Mitsubishi Gas Chemical Company, Inc., Tokyo (JP)

(72) Inventors: Kousuke Namiki, Tokyo (JP); Hitoshi Okazaki, Tokyo (JP); Eiji Koshiishi, Chiba (JP); Sawako Fuse, Tokyo (JP); Kikuo Furukawa, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 1 day.

(21) Appl. No.: 14/899,509

(22) PCT Filed: Jun. 26, 2014

(86) PCT No.: PCT/JP2014/066956
§ 371 (c)(1),
(2) Date: Dec. 17, 2015

(87) PCT Pub. No.: WO2014/208656
PCT Pub. Date: Dec. 31, 2014

(65) Prior Publication Data
US 2016/0152774 A1   Jun. 2, 2016

(30) Foreign Application Priority Data
Jun. 27, 2013  (JP) .................. 2013-134629

(51) Int. Cl.
*C08G 75/08* (2006.01)
*C09J 181/02* (2006.01)

(52) U.S. Cl.
CPC ............ *C08G 75/08* (2013.01); *C09J 181/02* (2013.01)

(58) Field of Classification Search
CPC ............................... C08G 75/08; C09J 181/02
See application file for complete search history.

(56) References Cited

U.S. PATENT DOCUMENTS

| | | | |
|---|---|---|---|
| 2003/0022956 A1 | 1/2003 | Wanigatunga et al. | |
| 2007/0066702 A1 | 3/2007 | Oakazaki et al. | |
| 2012/0095124 A1* | 4/2012 | Kirino ................. | C07C 243/40 522/26 |

FOREIGN PATENT DOCUMENTS

| JP | H6-329711 A | 11/1994 |
|---|---|---|
| JP | H9-71580 A | 3/1997 |
| JP | H9-110979 A | 4/1997 |
| JP | H9-255781 A | 9/1997 |
| JP | 2002-47346 A | 2/2002 |
| JP | 2002-105110 A | 4/2002 |
| JP | 2003-26806 A | 1/2003 |
| JP | 2011-38050 A | 2/2011 |
| JP | 2014-133875 A | 7/2014 |
| WO | 01/57113 A2 | 8/2001 |
| WO | 2005/014696 A1 | 2/2005 |

OTHER PUBLICATIONS

Sugita et al., machine English translation of JP 1994-329711 (published Nov. 29, 1994).*
International Search Report dated Sep. 22, 2014 for PCT/JP2014/066956 and English translation of the same. (4 pages).
Tunooka; "Development of Photosensitive Plymers by the Use of Photobase Generators"; Chemical Industry, vol. 50, 592-600 (1999).
Tachi et al.; Photochemical Reactions of Quaternary Ammonium Dithiocarbamates as Photobase Generators and Their Use in the Photoinitiated Thermal Crosslinking of Poly(glycidylethacrylate); Journal of Polymer Science: Part A: Polymer Chemistry, vol. 39, 1329-1341 (2001).

* cited by examiner

*Primary Examiner* — Michael Pepitone
*Assistant Examiner* — Jessica Roswell
(74) *Attorney, Agent, or Firm* — Fitch, Even, Tabin & Flannery LLP

(57) ABSTRACT

According to the present invention, a curable composition can be provided, said composition being characterized by comprising: (A) an episulfide compound; and (B) a photobase generator comprising an organoboron compound represented by general formula (1) below:

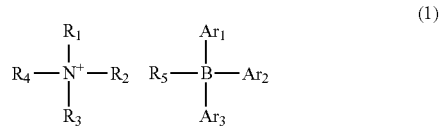

(1)

(In general formula (1), $R_1$, $R_2$, $R_3$, $R_4$ and $R_5$ may be the same as or different from one another and independently represent an alkyl group having 1 to 8 carbon atoms; and $Ar_1$, $Ar_2$ and $Ar_3$ may be the same as or different from one another and independently represent a group selected from the group consisting of a phenyl group, a naphthyl group, an anthracenyl group and a phenanthryl group, each of which may have a substituent selected from the group consisting of an alkyl group, an aryl group, an alkenyl group, a cycloalkyl group and a heterocyclic group.)

9 Claims, No Drawings

CURABLE COMPOSITION

TECHNICAL FIELD

The present invention relates to a photocurable composition comprising a photobase generator useful for producing optical materials such as an optical element adhesive, a coating agent for optical elements, a resist material, a prism, an optical fiber, an information recording substrate, a filter, a plastic lens and a light-guiding plate.

BACKGROUND ART

Plastic materials are lightweight, highly tough and easy to be dyed, and therefore are widely used recently for various types of optical materials. One of physical properties required for many optical materials is a high refractive index. With respect to optical materials having a high refractive index, many episulfide compounds by which optical materials having a refractive index of 1.7 or more can be obtained have been found (see Patent Documents 1, 2 and 3). Since most of compositions comprising these compounds are cured by means of thermal curing, intended use thereof is significantly limited, and a composition which can be photocured has been strongly desired.

Photo-curing of episulfide compounds is described in Patent Documents 4, 5, 6, 7 and 8. These documents disclose a radical generator, an acid generator, a base generator, etc. as initiators, but since base catalysts have the highest activity against polymerization of episulfide compounds, it is considered that a base generator is most desirably used. However, research on photobase generators has only a short history, and no photobase generator having polymerization activity enough for practical use has been found. Research on photobase generators is described in Non-Patent Documents 1 and 2.

Major problems of the photobase generators are that light absorption of episulfide compounds at up to near 300 nm almost overlaps the light absorption region of the photobase generators, resulting in low efficiency of generation of base by means of photolysis, and that since the basicity of base generated by means of photolysis is weak, polymerization and curing of episulfide compounds is slow.

Patent Document 9 proposes a photobase generator which improves the above-described problems. However, a composition obtained by adding the photobase generator to an episulfide compound has a short pot life, the viscosity of the composition is significantly increased within several hours to a dozen or so hours, and the composition is cured within several days. Thus, there is a problem that it is difficult to handle the composition because of short pot life (working life) thereof.

PRIOR ART DOCUMENTS

Patent Documents

Patent Document 1: Japanese Laid-Open Patent Publication No. H09-71580
Patent Document 2: Japanese Laid-Open Patent Publication No. H09-110979
Patent Document 3: Japanese Laid-Open Patent Publication No. H09-255781
Patent Document 4: International Publication WO01/57113 pamphlet
Patent Document 5: Japanese Laid-Open Patent Publication No. 2002-047346
Patent Document 6: Japanese Laid-Open Patent Publication No. 2002-105110
Patent Document 7: U.S. Laid-Open Publication No. 2003/0022956
Patent Document 8: Japanese Laid-Open Patent Publication No. 2003-026806
Patent Document 9: Japanese Laid-Open Patent Publication No. 2011-038050

Non-Patent Documents

Non-Patent Document 1: Chemical Industry (in Japanese), Vol. 50, pp. 592-600 (1999)
Non-Patent Document 2: J. Polym. Sci. Part A, Vol. 39, pp. 1329-1341 (2001)

SUMMARY OF THE INVENTION

Problems to be Solved by the Invention

The problems to be solved by the present invention are to provide a curable composition which comprises a photobase generator having a sufficient pot life and high activity and further comprises an episulfide compound that can be easily cured by ultraviolet irradiation, a cured product obtained by ultraviolet irradiation, and an optical material made of the cured product.

Means for Solving the Problems

The present inventors made researches in order to solve the above-described problems, and found that, when using a compound represented by general formula (1) below as a photobase generator, a composition comprising an episulfide compound has a sufficient pot life and is easily cured by ultraviolet irradiation, and a desired cured product can be obtained:

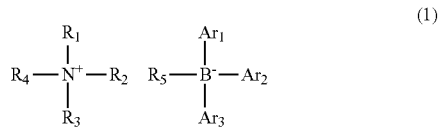

(1)

(In general formula (1), $R_1$, $R_2$, $R_3$, $R_4$ and $R_5$ may be the same as or different from one another and independently represent an alkyl group having 1 to 8 carbon atoms; and $Ar_1$, $Ar_2$ and $Ar_3$ may be the same as or different from one another and independently represent a group selected from the group consisting of a phenyl group, a naphthyl group, an anthracenyl group and a phenanthryl group, each of which may have a substituent selected from the group consisting of an alkyl group, an aryl group, an alkenyl group, a cycloalkyl group and a heterocyclic group.)

Specifically, the present invention is as follows:
[1] A curable composition comprising: (A) an episulfide compound; and (B) a photobase generator comprising an organoboron compound represented by the aforementioned general formula (1).
[2] The curable composition according to item [1], wherein (A) the episulfide compound is a compound represented by general formula (2) below:

(2)

wherein in general formula (2), m represents an integer from 0 to 4 and n represents an integer from 0 to 2.

[3] The curable composition according to item [2], wherein the compound represented by general formula (2) is bis(β-epithiopropyl)sulfide.

[4] The curable composition according to any one of items [1] to [3], further comprising (C) a sensitizer.

[5] The curable composition according to any one of items [1] to [4], further comprising (D) a thiol compound.

[6] A method for producing a cured product, which comprises curing the curable composition according to any one of items [1] to [5] by ultraviolet or visible-light irradiation.

[7] A cured product obtained by the production method according to item [6].

[8] An optical material comprising the cured product according to item [7].

[9] An optical adhesive comprising the curable composition according to any one of items [1] to [5].

[10] An optical material, wherein a microstructure is formed on the surface of a substrate, and wherein the curable composition according to any one of items [1] to [5] is used for forming the microstructure.

Advantageous Effect of the Invention

According to the present invention, it is possible to provide: a curable composition, which comprises a photobase generator having a sufficient pot life and high activity, and which further comprises an episulfide compound that is easily cured by ultraviolet irradiation; a cured product obtained by ultraviolet irradiation; and an optical material comprising the cured product.

EMBODIMENTS FOR CARRYING OUT THE INVENTION

Hereinafter, the present invention will be described in detail.

Regarding (A) the episulfide compound to be used in the present invention, it is sufficient when it is a compound having at least one episulfide group in one molecule, with which a cured product is produced by ring-opening polymerization. When pursuing crosslinking properties of a curable composition and a high refractive index of a cured product obtained, a compound having at least two episulfide groups in one molecule is preferred. In terms of handling properties, availability, balance of physical properties of a cured product, the aforementioned compound represented by general formula (2) is more preferred.

Specifically, preferred examples thereof include at least one episulfide compound selected from the group consisting of bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane and bis(β-epithiopropylthioethyl)sulfide.

Among them, particularly preferred specific example is bis(β-epithiopropyl)sulfide (formula (3)) and/or bis(β-epithiopropyl)disulfide (formula (4)), and the most preferred specific example is bis(β-epithiopropyl)sulfide:

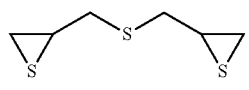

Bis(β-epithiopropyl)sulfide (3)

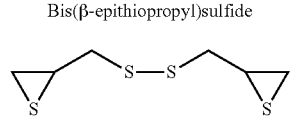

Bis(β-epithiopropyl)disulfide (4)

The ratio of (A) the episulfide compound in the curable composition of the present invention is usually 10 to 99.99% by mass, preferably 20 to 99.9% by mass, more preferably 30 to 99.9% by mass, and particularly preferably 50 to 99.5% by mass.

In (B) the organoboron compound represented by general formula (1) to be used in the present invention, $R_1$, $R_2$, $R_3$, $R_4$ and $R_5$ may be the same as or different from one another and independently represent an alkyl group having 1 to 8 carbon atoms, and $Ar_1$, $Ar_2$ and $Ar_3$ may be the same as or different from one another and independently represent a group selected from the group consisting of a phenyl group, a naphthyl group, an anthracenyl group and a phenanthryl group, each of which may have a substituent selected from the group consisting of an alkyl group, an aryl group, an alkenyl group, a cycloalkyl group and a heterocyclic group. Preferably, $R_1$, $R_2$, $R_3$ and $R_4$ are the same and represent an alkyl group having 2 to 5 carbon atoms. $R_1$, $R_2$, $R_3$ and $R_4$ more preferably represent a linear alkyl group, and most preferably represent an n-butyl group. $R_5$ is preferably an alkyl group having 2 to 5 carbon atoms, more preferably a linear alkyl group, and most preferably an n-butyl group. Preferably, $Ar_1$, $Ar_2$ and $Ar_3$ are the same and are a phenyl group or a naphthyl group, which may have a substituent such as an alkyl group and an aryl group at an aromatic ring. More preferably, $Ar_1$, $Ar_2$ and $Ar_3$ are the same and are a phenyl group, a 4-tert-butylphenyl group, a 1-naphthyl group or a 4-methyl-1-naphthyl group.

(B) the organoboron compound represented by general formula (1) is preferably tetrabutylammonium=butyltriphenylborate, tetrabutylammonium=butyl tri(4-tert-butylphenyl)borate, tetrabutylammonium=butyl tri(1-naphthyl)borate or tetrabutylammonium=butyl tri(4-methyl-1-naphthyl)borate. Note that "=" in the compound names means ionic bond. In terms of the balance between solubility in the episulfide compound, polymerizability of the episulfide compound and the pot life of the composition, tetrabutylammonium=butyl tri(1-naphthyl)borate is most preferred.

The amount of (B) the compound represented by general formula (1) to be used is usually 0.01 parts by mass or more, preferably 0.05 to 10 parts by mass, more preferably 0.05 to 3 parts by mass, and most preferably 0.1 to 1 parts by mass relative to 100 parts by mass of (A) the episulfide compound. From the viewpoint of the refractive index of the optical material obtained by curing the curable composition, the amount of the component (B) to be used is particularly preferably 1 parts by mass or less.

The curable composition of the present invention may include (C) a sensitizer in addition to the components (A) and (B). By blending (C) the sensitizer in the curable composition, a base can be more efficiently liberated from the component (B). As a result, the exposure time can be reduced and polymerization of the curable composition can be promoted.

Preferred examples of (C) the sensitizer include aromatic ketones such as substituted or unsubstituted benzophenone, thioxanthone and anthraquinone, or dyes such as oxazine, acridine, phenazine, and rhodamine, and compounds having a conjugated heterocycle such as fluorene, fluorenone and naphthalene. Particularly preferred are substituted or unsubstituted benzophenone, thioxanthone and fluorene. Specific examples thereof include benzophenone, 4,4'-bis(dimethylamino)benzophenone, 4,4'-bis(diethylamino)benzophenone, 4,4'-bis(ethylmethylamino)benzophenone, 4,4'-diphenylbenzophenone, 4,4'-diphenoxybenzophenone, 4,4'-bis(p-isopropylphenoxy)benzophenone, 4-methylbenzophenone, 2,4,6-trimethylbenzophenone, 4-phenylbenzophenone, 2-methoxycarbonylbenzophenone, 4-benzoyl-4'-methyldiphenylsulfide, 4-methoxy-3,3'-methylbenzophenone, isopropylthioxanthone, chlorothioxanthone, 1-chloro-4-propoxythioxanthone, 2-(trifluoromethyl)thioxanthone, 2,4-dimethylthioxanthone, 2,4-diethylthioxanthone, 1,3-dimethyl-2-(2-ethylhexyloxy)thioxanthone, fluorene, 9,9-dimethylfluorene and 9,9-bis[4-(2-hydroxyethoxy)phenyl] fluorene.

The above-described preferred examples of (C) the sensitizer may be used solely, or two or more of them may be used in combination. The amount of (C) the sensitizer to be used is 0.01 parts by mass or more, preferably 0.05 to 10 parts by mass, more preferably 0.05 to 3 parts by mass, and most preferably 0.1 to 1 parts by mass relative to 100 parts by mass of (A) the episulfide compound.

To the curable composition of the present invention, (D) a thiol compound can be added according to need. By the addition of the thiol compound, a cured product with less coloring and excellent in transparency can be obtained. The thiol compound as used herein is an organic compound having one or at least two thiol groups in one molecule. In terms of improving the mechanical strength of the cured product, the thiol compound is preferably a compound having at least two thiol groups.

Specific preferred examples of (D) the thiol compound include methanedithiol, methanetrithiol, 1,2-dimercaptoethane, bis(2-mercaptoethyl)sulfide, bis(2,3-dimercaptopropyl) sulfide, 1,2,3-trimercaptopropane, 2-mercaptomethyl-1,3-dimercaptopropane, 4-mercaptomethyl-1,8-dimercapto-3,6-dithiaoctane, 2,4-bis(mercaptomethyl)-1,5-dimercapto-3-thiapentane, 4,8-bis(mercaptomethyl)-1,11-dimercapto-3,6,9-trithiaundecane, 4,7-bis(mercaptomethyl)-1,11-dimercapto-3,6,9-trithiaundecane, 5,7-bis(mercaptomethyl)-1,11-dimercapto-3,6,9-trithiaundecane, 1,2,7-trimercapto-4,6-dithiaheptane, 1,2,9-trimercapto-4,6,8-trithianonane, 1,2,8,9-tetramercapto-4,6-dithianonane, 1,2,10,11-tetramercapto-4,6,8-trithiaundecane, 1,2,12,13-tetramercapto-4,6,8,10-tetrathiatridecane, tetrakis(mercaptomethyl)methane, tetrakis(4-mercapto-2-thiabutyl)methane, tetrakis(7-mercapto-2,5-dithiaheptyl)methane, trimethylolpropanetris(2-mercaptoacetate), trimethylolpropanetris(3-mercaptopropionate), pentaerythritol tetrakis(2-mercaptoacetate), pentaerythritol tetrakis(3-mercaptopropionate), 2,5-bis(mercaptomethyl)-1,4-dithiane, bis(4-mercaptophenyl)sulfide, bis(4-mercaptomethylphenyl)methane, 2,2-bis(4-mercaptomethylphenyl)propane, bis(4-mercaptomethylphenyl) ether and bis(4-mercaptomethylphenyl)sulfide.

The above-described preferred examples of (D) the thiol compound may be used solely, or two or more of them may be used in combination. The amount of (D) the thiol compound to be added is preferably 1 to 50 parts by mass, more preferably 3 to 40 parts by mass, and even more preferably 5 to 30 parts by mass relative to 100 parts by mass of the total of (A) the episulfide compound and (D) the thiol compound.

To the curable composition of the present invention, epoxy compounds, iso(thio)cyanates, phenols, amines, inorganic compounds having a sulfur atom, inorganic compounds having a selenium atom, etc. may be added for the purpose of the improvement of various performances such as weather resistance, oxidation resistance, strength, surface hardness, adhesion to the base material, refractive index and dye-affinity. In this case, a publicly-known catalyst for polymerization and curing may be separately added according to need.

The curable composition of the present invention is cured by ultraviolet or visible-light irradiation. The light source to be used in this case is not particularly limited as long as it is an apparatus generating ultraviolet or visible light. Specific examples thereof include a high pressure mercury lamp, a super-high pressure mercury lamp, a metal halide lamp, a high power metal halide lamp, a xenon lamp and a light-emitting diode (ultraviolet LED).

When photocuring the curable composition of the present invention, the polymerization may be inhibited due to influence of oxygen in the air. Therefore, for reducing the exposure time and sufficiently polymerizing the curable composition, the exposure is preferably performed under an atmosphere at a low oxygen concentration. Specific examples thereof include a method in which an atmosphere surrounding a curable composition is substituted with a nitrogen gas or carbon dioxide to perform exposure. In this case, the oxygen concentration is preferably 10% or less, and more preferably 5% or less. In addition, a method in which the surface of a curable composition is covered with a transparent film such as a polypropylene film to perform exposure, or a method in which a curable composition is injected into a transparent mold composed of glass, etc. with being sealed to perform exposure can also be employed.

By carrying out the heat treatment after ultraviolet or visible-light irradiation of the curable composition, curing can be further promoted. After ultraviolet irradiation, the heating temperature and heating time can be suitably selected according to the cure degree desired for the optical material, but preferably, the heating temperature is room temperature to 150° C. and the heating time is 1 minutes to 3 days.

EXAMPLES

Hereinafter, the present invention will be specifically described by way of illustrative examples, but the present invention is not limited thereto.

In the Examples, (A) the episulfide compound was synthesized based on the method described in Japanese Laid-Open Patent Publication No. H09-110979 and Japanese Laid-Open Patent Publication No. 2001-163874. Further, every (B) the compound represented by general formula (1) was obtained from Showa Denko K.K. and directly used in the experiment.

Hereinafter, tetrabutylammonium=butyl tri(1-naphthyl) borate is referred to as PBG1, tetrabutylammonium=butyltriphenylborate is referred to as PBG2, tetrabutylammonium=butyl tri(4-methyl-1-naphthyl)borate is referred to as PBG6, and tetrabutylammonium=butyl tri(4-tert-butylphenyl)borate is referred to as PBG7. Further, methyl 4-((hexahydro pyrrolo[1,2-α]pyrimidine-1(2H)-yl)

methyl)benzoate (hereinafter referred to as PBG3) was synthesized based on the method described in Japanese National-phase PCT Laid-Open Patent Publication No. 2005-511536, 1-(4'-phenylthio)phenacyl-(5-azonia-1-azabicyclo[4,3,0]-5-nonene)tetraphenyl borate (hereinafter referred to as PBG4) was synthesized based on the method described in Japanese Laid-Open Patent Publication No. 2005-264156, and tributyl naphthoylmethyl ammonium butyl triphenyl borate (hereinafter referred to as PBG5) was synthesized based on the method described in J. Phys. Chem. 1996, 100, 12386-12393 and J. Phys. Chem. A 1998, 102, 5375-5382. Further, 4-benzoyl-4'-methyldiphenylsulfide which is (C) the sensitizer (product name: Lunacure BMS (hereinafter abbreviated as BMS)) was obtained from DKSH Japan K.K. and directly used. The other sensitizers were obtained from Tokyo Chemical Industry Co., Ltd. and directly used. As (D) the thiol compounds, bis(2-mercaptoethyl)sulfide (hereinafter referred to as DMDS) was obtained from Tokyo Chemical Industry Co., Ltd., pentaerythritol tetrakis-thiopropionate (hereinafter referred to as PETP) was obtained from Yodo Kagaku Co., Ltd., and pentaerythritol tetrakis(3-mercaptobutyrate) (hereinafter referred to as PE1) was obtained from Showa Denko K.K., and these substances were directly used. 1,2-bis[(2-mercaptoethyl)thio]-3-mercaptopropane (hereinafter referred to as GST) was synthesized based on the method described in International Publication WO 2007/129450 pamphlet.

As the light source for exposure of the curable composition, a metal halide lamp (30 mW/cm$^2$, equipped with a heat ray cutting filter, manufactured by Eye Graphics Co., Ltd.) was used.

The photocurability of the curable composition was evaluated based on the exposure time required for being cured in a state in which tackiness (stickiness) is not left on the surface. The case of being cured in less than 20 seconds was rated as "A", the case of being cured in 20 seconds or more and less than 40 seconds was rated as "B", the case of being cured in 40 seconds or more and less than 60 seconds was rated as "C", and the case of being cured in 1 minute or more or the case of uncured was rated as "D".

Further, regarding the refractive index (nD) of the obtained cured product, the value at the D-line was measured using an Abbe refractometer ("NAR-4T" manufactured by Atago Co., Ltd.). The measurement temperature was set at 20° C.

Regarding the pot life of the curable composition, the case where the viscosity of the curable composition preserved at 30° C. for 7 days was increased from the initial viscosity at a rate of 20% or less was evaluated as "good", and the case where the viscosity was significantly increased from the initial viscosity at a rate of 20% or more or the case where the curable composition was solidified was evaluated as "poor". In the production of optical materials using a photocurable composition, the production is usually performed continuously for several days to about a week. Therefore, from the viewpoint of productivity, the viscosity stability (polymerization suppression) of the curable composition at near room temperature under a light blocking condition is very important.

Example 1

With (A) bis(β-epithiopropyl)sulfide (100 parts by mass), (B) PBG1 (0.5 parts by mass) was mixed, and the mixture was stirred until it became homogeneous, thereby preparing a solution of a curable composition. The viscosity of the solution of the curable composition at 20° C. (initial viscosity) was 12 mPa·s. An appropriate amount of the solution of the curable composition was dropped on a slide glass, and it was covered with a PET film ("Lumirror T60" manufactured by Toray Industries, Inc., thickness: 250 µm) in a manner such that the thickness of the solution of the curable composition became about 10 µm. Subsequently, it was irradiated with a light of the metal halide lamp from the PET film side, and the time required for the curable composition to be cured in a state in which tackiness (stickiness) was not left on the surface was confirmed. It was 40 seconds or more and less than 60 seconds.

After exposure for 1 minute, the PET film was removed. The refractive index of the cured film was measured, and nD was 1.71. The cured film was colorless.

Further, an unexposed solution of the curable composition was put into a light-blocking bottle, and it was allowed to stand in a constant temperature test machine at 30° C. for 7 days to confirm the pot life. Even after being allowed to stand, the curable composition was in a liquid form, and the viscosity at 20° C. was 13 mPa·s. There was no marked change in the viscosity, and it was "good".

Examples 2 to 22

The curing test was carried out in a manner similar to that in Example 1, except that the component (B), the component (C), the component (D) and the respective amounts thereof to be added were changed to those described in Table 1. Note that predetermined amounts of the components (B) and (C) were added to 100 parts by mass of the total of the components (A) and (D).

The exposure time required for curing, the refractive index of the cured film and the color of the cured film were as shown in Table 1. Further, the pot life was confirmed in a manner similar to that in Example 1. Even after the solution of the curable composition was allowed to stand at 30° C. for 7 days, there was no marked change in the viscosity and it was "good".

Comparative Examples 1-4

The curing test was carried out in a manner similar to that in Example 1, except that the component (B), the component (C), the component (D) and the respective amounts thereof to be added were changed to those described in Table 1. Note that predetermined amounts of the components (B) and (C) were added to 100 parts by mass of the total of the components (A) and (D).

The exposure time required for curing, the refractive index of the cured film and the color of the cured film were as shown in Table 1. Further, the pot life was confirmed in a manner similar to that in Example 1. In each case, after the solution of the curable composition was allowed to stand at 30° C. for 7 days, it was solidified and evaluated as "poor".

TABLE 1

|  | Monomer A (Component A) | Base generator (Component B) | Amount of addition | BMS (Component C) | DMDS (Component D) | Photo-curability | Color | nD | Pot life |
|---|---|---|---|---|---|---|---|---|---|
| Example 1 | 100 | PBG1 | 0.5 | — | — | C | Colorless | 1.71 | Good |
| Example 2 | 100 | ↑ | 0.1 | — | — | C | Colorless | 1.71 | Good |
| Example 3 | 100 | ↑ | 1 | — | — | C | Colorless | 1.71 | Good |
| Example 4 | 100 | ↑ | 0.5 | 1 | — | A | Pale yellow | 1.71 | Good |
| Example 5 | 90 | ↑ | 0.5 | — | 10 | C | Colorless | 1.71 | Good |
| Example 6 | 90 | ↑ | 0.5 | 1 | 10 | A | Pale yellow | 1.71 | Good |
| Example 7 | 90 | PBG2 | 0.3 | 1 | 10 | B | Pale yellow | 1.71 | Good |
| Example 8 | 100 | PBG1 | 3 | — | — | C | Colorless | 1.70 | Good |
| Example 9 | 90 | ↑ | 0.5 | 0.3 | 10 | A | Pale yellow | 1.71 | Good |
| Example 10 | 90 | ↑ | 1 | 1 | 10 | A | Pale yellow | 1.71 | Good |
| Example 11 | 90 | ↑ | 3 | 1 | 10 | A | Pale yellow | 1.70 | Good |
| Example 12 | 90 | ↑ | 5 | 1 | 10 | A | Pale yellow | 1.70 | Good |
| Example 13 | 90 | ↑ | 0.5 | 3 | 10 | A | Pale yellow | 1.70 | Good |
| Example 14 | 90 | ↑ | 0.5 | 5 | 10 | A | Pale yellow | 1.70 | Good |
| Example 15 | 100 | PBG6 | 0.1 | — | — | C | Colorless | 1.71 | Good |
| Example 16 | 100 | ↑ | 0.5 | — | — | C | Colorless | 1.71 | Good |
| Example 17 | 100 | ↑ | 1 | — | — | C | Colorless | 1.71 | Good |
| Example 18 | 100 | ↑ | 0.5 | 1 | — | A | Pale yellow | 1.71 | Good |
| Example 19 | 90 | ↑ | 0.5 | 1 | 10 | A | Pale yellow | 1.71 | Good |
| Example 20 | 90 | ↑ | 1 | 1 | 10 | A | Pale yellow | 1.71 | Good |
| Example 21 | 90 | ↑ | 3 | 1 | 10 | A | Pale yellow | 1.70 | Good |
| Example 22 | 90 | PBG7 | 0.2 | 1 | 10 | B | Pale yellow | 1.71 | Good |
| Comparative Example 1 | 100 | PBG3 | 0.5 | 1 | — | A | Pale yellow | 1.71 | Poor |
| Comparative Example 2 | 100 | PBG4 | 0.5 | 1 | — | A | Pale yellow | 1.71 | Poor |
| Comparative Example 3 | 100 | PBG5 | 0.5 | 1 | — | A | Pale yellow | 1.71 | Poor |
| Comparative Example 4 | 90 | PBG5 | 0.5 | 1 | 10 | A | Pale yellow | 1.71 | Poor |

Photocurability: exposure time required for curing, A: less than 20 seconds, B: 20 seconds or more and less than 40 seconds, C: 40 seconds or more and less than 60 seconds, D: 1 minute or more
Pot life: State after preserved at 30° C. for 7 days, Good: there was no marked change in the viscosity, Poor: the viscosity was increased or the composition was solidified.
Monomer A: bis(β-epithiopropyl)sulfide
BMS: Lunacure BMS

Examples 23-28

The curing test was carried out in a manner similar to that in Example 10, except that (A) the episulfide compound was changed to bis(β-epithiopropyl)disulfide and the amounts of BMS (component (C)) and DMDS (component (D)) to be added were changed to those shown in Table 2.

The exposure time required for curing, the refractive index of the cured film, the color of the cured film and the pot life were as shown in Table 2.

Examples 29-33

The curing test was carried out in a manner similar to that in Example 8, except that (C) the sensitizer and the amount thereof to be added were changed to those shown in Table 3.

The exposure time required for curing, the color of the cured film and the pot life were as shown in Table 3.

TABLE 2

|  | Monomer A2 (Component A) | Base generator (Component B) | Amount of addition | BMS (Component C) | DMDS (Component D) | Photocurability | Color | nD | Pot life |
|---|---|---|---|---|---|---|---|---|---|
| Example 23 | 100 | PBG1 | 0.5 | — | — | C | Pale yellow | 1.74 | Good |
| Example 24 | 100 | ↑ | 1 | — | — | C | Pale yellow | 1.73 | Good |
| Example 25 | 100 | ↑ | 3 | — | — | C | Pale yellow | 1.73 | Good |
| Example 26 | 100 | ↑ | 0.5 | 1 | — | A | Pale yellow | 1.73 | Good |
| Example 27 | 90 | ↑ | 0.5 | — | 10 | C | Pale yellow | 1.73 | Good |
| Example 28 | 90 | ↑ | 0.5 | 1 | 10 | A | Pale yellow | 1.73 | Good |

Photocurability: exposure time required for curing, A: less than 20 seconds, B: 20 seconds or more and less than 40 seconds, C: 40 seconds or more and less than 60 seconds, D: 1 minute or more
Pot life: State after preserved at 30° C. for 7 days, Good: there was no marked change in the viscosity, Poor: the viscosity was increased or the composition was solidified.
Monomer A2: bis(β-epithiopropyl)disulfide
BMS: Lunacure BMS
DMDS: bis(2-mercaptoethyl)sulfide

TABLE 3

| | Monomer A (Component A) | DMDS (Component D) | PBG1 (Component B) | Component C | Amount of addition | Photocurability | Color | Pot life |
|---|---|---|---|---|---|---|---|---|
| Example 29 | 90 | 10 | 1 | 4-phenylbenzophenone | 0.3 | A | Pale yellow | Good |
| Example 30 | ↑ | ↑ | ↑ | ↑ | 1 | A | Pale yellow | Good |
| Example 31 | ↑ | ↑ | ↑ | ↑ | 3 | A | Pale yellow | Good |
| Example 32 | ↑ | ↑ | ↑ | Dibenzoyl | 4 | B | Pale yellow | Good |
| Example 33 | ↑ | ↑ | ↑ | Fluorene | 10 | B | Pale yellow | Good |

Photocurability: exposure time required for curing, A: less than 20 seconds, B: 20 seconds or more and less than 40 seconds, C: 40 seconds or more and less than 60 seconds, D: 1 minute or more
Pot life: State after preserved at 30° C. for 7 days, Good: there was no marked change in the viscosity, Poor: the viscosity was increased or the composition was solidified.
Monomer A: bis(β-epithiopropyl)sulfide
DMDS: bis(2-mercaptoethyl)sulfide Examples 34-39

The curing test was carried out in a manner similar to that in Example 10, except that (D) the thiol compound and the amount thereof to be added were changed to those shown in Table 4.

The exposure time required for curing, the refractive index of the cured film, the color of the cured film and the pot life were as shown in Table 4.

TABLE 4

| | Monomer A (Component A) | PBG1 (Component B) | BMS (Component C) | Component D | Amount of addition | Photocurability | Color | nD | Pot life |
|---|---|---|---|---|---|---|---|---|---|
| Example 34 | 80 | ↑ | 1 | DMDS | 20 | A | Pale yellow | 1.69 | Good |
| Example 35 | 90 | ↑ | ↑ | GST | 10 | A | Pale yellow | 1.71 | Good |
| Example 36 | 70 | ↑ | ↑ | ↑ | 30 | A | Pale yellow | 1.69 | Good |
| Example 37 | 90 | ↑ | ↑ | PETP | 10 | A | Pale yellow | 1.69 | Good |
| Example 38 | 90 | ↑ | ↑ | PE1 | 10 | A | Pale yellow | 1.71 | Good |
| Example 39 | 70 | ↑ | ↑ | ↑ | 40 | A | Pale yellow | 1.63 | Good |

Photocurability: exposure time required for curing, A: less than 20 seconds, B: 20 seconds or more and less than 40 seconds, C: 40 seconds or more and less than 60 seconds, D: 1 minute or more
Pot life: State after preserved at 30° C. for 7 days, Good: there was no marked change in the viscosity, Poor: the viscosity was increased or the composition was solidified.
Monomer A: bis(β-epithiopropyl)sulfide
DMDS: 1,2-bis [(2-mercaptoethyl)thio]-3-mercaptopropane
GST: 1,2-bis[(2-mercaptoethyl)thio]-3-mercaptopropane
PETP: pentaerythritol tetrakis-thiopropionate
PE1: pentaerythritol tetrakis(3-mercaptobutyrate)

Example 40

With (A) bis(β-epithiopropyl)sulfide (100 parts by mass), (B) PBG1 (0.5 parts by mass) was mixed, and the mixture was stirred until it became homogeneous, thereby preparing a solution of a curable composition. This solution of the curable composition was applied to a quartz glass having a thickness of 1 mm, and the applied surface was covered with another quartz glass having a thickness of 1 mm, thereby preparing a sample (a spacer was provided so that the thickness after curing became 40 μm±2 μm). Subsequently, it was irradiated with a light of a metal halide lamp for 1 minute. The sample sandwiched by the quartz glasses having the thickness of 1 mm tightly adhered thereto, and the adhesive cured layer was colorless without white turbidity and showed good transparency.

Example 41

With (A) bis(β-epithiopropyl)sulfide (90 parts by mass) and (D) DMDS (10 parts by mass), (B) PBG1 (1 part by mass) and (C) BMS (1 part by mass) were mixed, and the mixture was stirred until it became homogeneous, thereby preparing a solution of a curable composition. This solution of the curable composition was filtered with a PTFE filter having a pore diameter of 0.45 μm, and an appropriate amount of the solution was dropped on an easily-adhesive PET film (Cosmoshine A4100, thickness: 100 μm, manufactured by Toyobo Co., Ltd.). It was covered with a nickel mold with a prism column formed (apex angle: 90°, pitch: 50 μm), and it was irradiated with a light of a metal halide lamp from the PET film side for 1 minute. After the light irradiation, the PET film to which the structure was transferred was removed from the mold. The cured product was not left in the mold at all, showing good mold release characteristics. In this way, an optical film with the prism column transferred was prepared. The surface structure thereof was observed using an SEM (scanning electron microscope). It was confirmed that the prism structure of the mold was accurately transferred, and the transferability was good.

The invention claimed is:

1. A curable composition comprising: (A) an episulfide compound; and (B) a photobase generator comprising an organoboron compound represented by general formula (1) below:

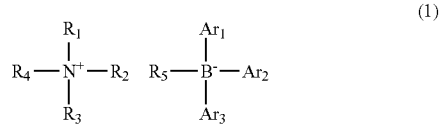

wherein in general formula (1): $R_1$, $R_2$, $R_3$, $R_4$ and $R_5$ may be the same as or different from one another and independently represent an alkyl group having 1 to 8 carbon atoms; and $Ar_1$, $Ar_2$ and $Ar_3$ may be the same as or different from one another and independently represent a group selected from the group consisting of a phenyl group, a naphthyl group, an anthracenyl group and a phenanthryl group, each of which may have a substituent selected from the group consisting of an alkyl group, an aryl group, an alkenyl group, a cycloalkyl group and a heterocyclic group,
  wherein (A) the episulfide compound is a compound represented by general formula (2) below:

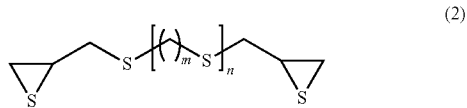

(2)

wherein in general formula (2), m represents an integer from 0 to 4 and n represents an integer from 0 to 2, and
  wherein the ratio of (A) the episulfide compound in the curable composition is 30 to 99.9% by mass.

2. The curable composition according to claim 1, wherein the compound represented by general formula (2) is bis(β-epithiopropyl)sulfide.

3. The curable composition according to claim 1, further comprising (C) a sensitizer.

4. The curable composition according to claim 1, further comprising (D) a thiol compound.

5. A method for producing a cured product, which comprises curing the curable composition according to claim 1 by ultraviolet or visible-light irradiation.

6. A cured product obtained by the production method according to claim 5.

7. An optical material comprising the cured product according to claim 6.

8. An optical adhesive comprising the curable composition according to claim 1.

9. An optical material, wherein a microstructure is formed on the surface of a substrate, and wherein the curable composition according to claim 1 is used for forming the microstructure.

* * * * *